United States Patent
Kansal et al.

(10) Patent No.: US 9,176,841 B2
(45) Date of Patent: Nov. 3, 2015

(54) ESTIMATING APPLICATION ENERGY USAGE IN A TARGET DEVICE

(75) Inventors: Aman Kansal, Issaquah, WA (US); Ranveer Chandra, Kirkland, WA (US); Jie Liu, Medina, WA (US); Paramvir Bahl, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 203 days.

(21) Appl. No.: 13/339,358

(22) Filed: Dec. 28, 2011

(65) Prior Publication Data

US 2013/0174128 A1 Jul. 4, 2013

(51) Int. Cl.
- G06F 9/44 (2006.01)
- G06F 11/34 (2006.01)
- G06F 11/30 (2006.01)

(52) U.S. Cl.
CPC ........ G06F 11/3457 (2013.01); G06F 11/3062 (2013.01); *G06F 2201/865* (2013.01); *Y02B 60/165* (2013.01)

(58) Field of Classification Search
CPC .......................... G06F 11/3457; G06F 11/3062
USPC .......................................................... 717/135
See application file for complete search history.

(56) References Cited

U.S. PATENT DOCUMENTS

| | | | |
|---|---|---|---|
| 5,694,607 A | 12/1997 | Dunstan et al. | |
| 6,609,208 B1 | 8/2003 | Farkas et al. | |
| 6,990,662 B2 * | 1/2006 | Messer et al. | 717/174 |
| 7,007,256 B2 | 2/2006 | Sarkar et al. | |
| 7,216,243 B2 | 5/2007 | Chou et al. | |
| 7,549,069 B2 * | 6/2009 | Ishihara et al. | 713/320 |
| 8,527,627 B2 * | 9/2013 | Gerber et al. | 709/224 |
| 8,732,487 B2 * | 5/2014 | Goraczko et al. | 713/300 |
| 2007/0004468 A1 | 1/2007 | Boros | |
| 2007/0219732 A1 | 9/2007 | Creus et al. | |
| 2007/0245163 A1 * | 10/2007 | Lu et al. | 713/300 |
| 2009/0006878 A1 * | 1/2009 | Borghetti et al. | 713/340 |
| 2009/0044032 A1 | 2/2009 | Chainer | |
| 2009/0119233 A1 * | 5/2009 | Dunagan et al. | 705/412 |
| 2009/0258641 A1 * | 10/2009 | Yaqub et al. | 455/426.1 |
| 2009/0319988 A1 | 12/2009 | Teranishi et al. | |
| 2010/0205137 A1 * | 8/2010 | Barsness et al. | 706/52 |
| 2010/0262842 A1 * | 10/2010 | Kansal et al. | 713/300 |
| 2010/0268523 A1 * | 10/2010 | Dhanwada et al. | 703/21 |
| 2010/0313270 A1 | 12/2010 | Kim et al. | |

(Continued)

OTHER PUBLICATIONS

Chedid et al., Applicant Provided Prior Art.*

(Continued)

*Primary Examiner* — Don Wong
*Assistant Examiner* — Theodore Hebert
(74) *Attorney, Agent, or Firm* — Gregg R. Wisdom; Judy Yee; Micky Minhas

(57) ABSTRACT

Embodiments provide implementations for estimating a test application's energy usage on a target device based on execution of the test application. Resource usage associated with the execution of the test application is measured. The measured resource usage is input into a power model of the target device to estimate the energy that the test application uses when executed on the target device. An emulation system is configured to execute the test application in a virtual execution environment using resource scaling and simulated target device application programming interfaces to substantially simulate the corresponding capabilities of the target device.

20 Claims, 5 Drawing Sheets

(56) References Cited

U.S. PATENT DOCUMENTS

| | | | |
|---|---|---|---|
| 2012/0011378 A1* | 1/2012 | Dalton et al. | 713/300 |
| 2012/0053925 A1* | 3/2012 | Geffin et al. | 703/21 |
| 2013/0174128 A1* | 7/2013 | Kansal et al. | 717/135 |

OTHER PUBLICATIONS

Chedid et al., Power Analysis and Optimization Techniques for Energy Efficient Computer Systems, Applicant Provided Prior Art (2009).*

Chedid, et al., "Power Analysis and Optimization Techniques for Energy Efficient Computer Systems", retrieved on Feb. 17, 2009 at <<http://academic.csuohio.edu/yuc/papers/survey_10_18_final.pdf>>, pp. 1-46.

Choi, et al., "Fine-Grained-Dynamic Voltage and Frequency Scaling for Precise Energy and Performance Trade-off based on the Ratio of Off-chip Access to On-chip Computation Times", retrieved on Feb. 17, 2009 at <<http://atrak.usc.edu/~massoud/Papers/PMU-DVFS-date04.pdf>>, Department of EE-Systems, USC, Los Angeles, CA., Feb. 2004, 6 pages.

Coburn et al, "Power Emulation: A New Paradigm for Power Estimation," DAC 2005, Anaheim, California, Jun. 2005, pp. 700-705.

Dong et al, "Sesame: Self-Constructive Energy Modeling for Battery-Powered Mobile Systems," Dec. 2010, pp. 1-14.

"Enterprise Server and Data Center Energy Efficiency Initiatives", available as early as Feb. 17, 2009 at <<http://www.energystar.gov/index.cfm?c=prod_development.server_efficiency>>, retrieved on Feb. 25, 2009, 4 pages.

"Event Tracing for Windows (ETW)", available as early as Feb. 17, 2009 at <<http://msdn.microsoft.com/en-us/library/aa468736.aspx>>, Microsoft Corporation, retrieved on Feb. 25, 2009, 1 page.

Flinn, et al., "Managing Battery Lifetime With Energy-Aware Adaptation", ACM Transactions on Computer Systems, vol. 22, Issue 2, May 2004, pp. 137-179.

Fonseca, et al., "Quanto: Tracking Energy in Networked Embedded Systems", retrieved on Feb. 17, 2009 at <<http://www.usenix.org/events/osdi08/tech/full_papers/fonseca/fonseca.pdf>>, 8th USENIX Symposium on Operating Systems Design and Implementation, pp. 323-338.

Kansai et al, "Virtual Machine Power Metering and Provisioning," SoCC'10, Indianapolis, Indiana, Jun. 2010, 12 pages.

Krishnan, et al., "Power Analysis of Disk I/O Methodologies", available as early as Feb. 17, 2009 at 21 <http://software.intel.com/en-us/articles/power-analysis-of-disk-io-methodologies/>>, Intel Software Network, retrieved on Feb. 25, 2009, 11 pages.

Lee, et al., "An Energy Charactization Framework for Software-Based Embedded Systems", retrieved on Feb. 17, 2009 at <<https://qir.kyushu-u.ac.jp/dspace/bitstream/2324/6347/1/donghoon06_1.pdf>>, Oct. 2006, 6 pages.

Mayo et al, "Energy Consumption in Mobile Devices: Why Future Systems Need Requirements—Aware Energy Scale-Down," Power-Aware Computer Systems, 2003, 15 pages.

Office Action for U.S. Appl. No. 12/420,372, mailed on Nov. 3, 2011, Aman Kansal, "Computational Energy Measurement Without Hardware Support", 6 pgs.

Rantala et al, "Modeling Energy Efficiency in Wireless Internet Communication," MobiHeld'09, Barcelona, Spain, Aug. 17, 2009, pp. 67-68.

Rice et al, "Decomposing power measurements for mobile devices," In Eighth Annual IEEE International Conference on Pervasive Computing and Communications (PerCom), Mar. 29-Apr. 2, 2010, 9 pages.

Rivoire, et al., "A Comparison of High-Level Full-System Power Models", available as early as Feb. 17, 2009 at <<http://www.usenix.org/events/hotpower08/tech/full_papers/rivoire/rivoire_html>>, retrieved on Feb. 25, 2009, 11 pages.

Seo, et al., "An Energy Consumption Framework for Distributed Java-Based Systems", In the Proceedings of the Twenty-Second IEEE/ACM International Conference on Automated Software Engineering, Nov. 2007, pp. 421-424.

Seo, et al., "A Generic Approach for Estimating the Energy Consumption of Component-Based Distributed Systems", retrieved on Feb. 17, 2009 at <<http://sunset.usc.edu/publications/TECHRPTS/2005/usccse2005-506/usccse2005-506.pdf>>, Department of Computer Science, USC, Los Angeles, CA., pp. 1-14.

Steigerwald, et al., "Creating Energy-Efficient Software", retrieved on Feb. 17, 2009 at <<http://software.intel.com/media/js/ie_file.php?f=http://software.intel.com/file/1347>>, Intel Leap Ahead, 2007, Intel Corporation, 30 pages.

Thompson et al, "Analyzing Mobile Application Software Power Consumption Via Model-Driven Engineering," In Proceedings PECCS, Feb. 2011, 13 pages.

Wikipedia, "Nonintrusive Load Monitoring", retrieved on Nov. 1, 2011 at <<http://en.wikipedia.org/w/index.php?title=Nonintrusive_load_monitoring&oldid=270184823>>, Feb. 12, 2009, 1 pg.

Office Action for U.S. Appl. No. 12/420,372, mailed on Mar. 28, 2012, Aman Kansal, "Computational Energy Measurement Without Hardware Support", 7 pgs.

"3GPP: Setting the Standard for Mobile Broadband", Retrieved on Feb. 3, 2010 from <<http://www.3gpp.org/>>, 1 page.

Balan, "Simplifying Cyber foraging", Proceedings of the 5th International conference on Mobile Systems, Applications and Services, Jun. 2007, 291 pages.

Balan et al., "Tactics-based Remote Execution for Mobile Computing", Proceedings of the 1st International Conference on Mobile Systems, Applications and Services, May 2003, 14 pages.

Balan et al.,"The Case for cyber foraging", Proceedings of the 10th Workshop on ACM SIGOPS European Workshop, Jul. 2002, 6 pages.

Chen et al., "Energy-aware Compilation and Execution in Java-Enabled Mobile Devices", Proceedings of the 17th International Symposium on Parallel and Distributed Processing, Apr. 2003, 8 pages.

Chun et al., "Augmented Smartphone Applications Through Clone Cloud Execution", HotOS, May 2009, 5 pages.

Clark et al., "Live Migration of Vitual Machines", Proceedings of the 2nd ACM/USENIX Symposium on Networked Systems Design and Implementation (NSDI), May 2005, 14 pages.

"D. Hesse, Sprint's CEO Dan Hesse Chats with Charlie Rose", BlueRoomSolution, Mar. 2010, 2 pages.

Doan et al., "Design Considerations for 60 GHz CMOS Radios", IEEE Communications Magazine, Dec. 2004, pp. 132-140.

Douglis et al., "Transparent Process Migration: Design Alternatives and the Sprite Implementation", Software Practice and Experience, vol. 21, No. 8, Aug. 1991, pp. 757-785.

"Ecma Demonstrates Multi-gigabit Radio", Ecma International Press Release, Nov. 2008, 2 pages.

Fjellheim et al., "The 3DMA Middleware for Mobile Applications", Proceedings of the International Conference on Embedded and Ubiquitous Computing, Aug. 2004, 17 pages.

Flinn et al., "Balancing Performance, Energy, and Quality in Pervasive Computing", Proceedings of the 22nd International Conference on Distributed Computing Systems (CDCS'02), Jul. 2002, 14 pages.

Flinn et al., "Data Staging on Untrusted Surrogates", Intel Research Publications, May 2002, 14 pages.

Flinn et al., "Self-Tuned Remote Execution for Pervasive Computing", Proceedings of the Eighth Workshop on Hot Topics in Operating Systems, May 2001, 6 pages.

Gray, "Agent TCL: A Flexible and Secure Mobile-Agent System", A Thesis Submitted to Faculty, Dartmouth College, Hanover, New Hampshire, Jun. 1997, 297 pages.

Gu et al., "Adaptive Offloading for Pervasive Computing", IEEE Prevasive Computing, vol. 3, No. 3, Jul. 2004, pp. 66-73.

Huang et al., "Anatomizing Application Performance Differences on Smartphones", Microsoft Research, Jun. 2010, 13 pages.

Hunt et al., "The Coign Automatic Distributed Partitioning System", Proceedings of the 3rd Symposium on Operating System Design and Implementation (OSDI'99), Feb. 1999, 15 pages.

Joseph et al., "Rover: A Toolkit for Mobile Information Access", Proceedings of the Fifteenth Symposium on Operating System Principles, Dec. 1995, 16 pages.

Kansal et al., "Fine-grained Energy Profiling for Power-Aware Application Design", ACM SIGMETRICS Performance Evaluation Review, vol. 36, No. 2, Sep. 2008, 5 pages.

(56) References Cited

OTHER PUBLICATIONS

Kim et al., "Safety, Visibility, and Performance in a Wide-Area File System", Proceedings of the 1st USENIX Conference on File and Storage Technologies, Jan. 2002, 14 pages.

Kincaid, "YouTube Mobile Uploads up 400% Since iPhone 3GS Launch", Techcrunch, Jun. 2009, 1 page.

Kougiouris, Use Reflection to Discover and ssess the Most Common Kougiouris, "Use Reflection to Discover and Assess the Most Common .NET Types", retrieved on Feb. 3, 2010 from <<http://msdn.microsoft.com/en-us/magazine/cc188926(printer).aspx>>, MSDN, 11 pages.

Koul et al., "E-Mobile: A heterogeneous agent-based, remote off-loading framework for efficient energy managegment of mobile devices", retrieved on Feb. 2, 2010 from <<http://pages.cs.wisc.edu/~meetraja/Site/Raja_Bala_@_UW-Madison_files/EnergyMgmt838_Rohit_Raja.pdf>>, 10 pages.

Kremer et al., "Compiler-Directed Remote Task Execution for Power Management", Workshop on Compilier and Operating Systems for Low Power, Oct. 2000, 8 pages.

Lewin, "iPhone Users 30 Times More Likely to Watch YouTube Videos", OLX Free Classifieds, Mar. 2008, 2 pages.

Li et al., "Computation Offloading to Save Energy on Handheld Devices: A Partition Scheme", Proceedings of the International Conference on Compilers, Architecture, and Synthesis for Embedded Systems (CASES'01), Nov. 2001, pp. 238-246.

"Mobius: A Multi-Tier Socially-Aware Network Infrastructure", Retrieved on Feb. 3, 2010 from <<http://www.cse.usf.edu/dsg/mobius/>>, 3 pages.

"Monsoon Solutions Inc", retrieved on Feb. 3, 2010, from <<http://www.msoon.com>>, 1 page.

Mullender et al., "Amoeba—A Distributed Operating System for the 1990s", IEEE Computer, May 1990, 13 pages.

Neubauer et al., "From Sequential Programs to Multi-Tier Applications by Program Transformation", Proceedings of the 32nd ACM SIGPLAN-SIGACT Symposium on Principles of Programming Languages (POPL'05), Jan. 2005, 12 pages.

Newton et al., "Wishbone Profile-based Partitioning for Sensornet Applications", 6th USENIX Symposium on Networked Systems Designs and Implementation (NSDI'09), Apr. 2009, pp. 395-408.

Noble et al., "Agile Application-aware Adaption for Mobility", Proceedings of the 16th ACM Symposium on Operating System Principles, Oct. 1997, 12 pages.

Osman et al., "The Design and Implementation of Zap: A System for Migrating Computing Environments", Proceedings of the 5th Symposium on Operating System Design and Implementation (OSDI 2002), Dec. 2002, 16 pages.

Palacin, "Recent Advances in Rechargeable Battery Materials: A Chemist's Perspective", retrieved from <<http://www.ncbi.nlm.nih.gov/pubmed/19690737>>, Jun. 2003, 1 page.

Powers, "Batteries for Low Power Electronics", Proceedings of the IEEE, vol. 83, No. 4, Apr. 1995, pp. 687-693.

Prasad et al., "Bandwidth Estimation: Metrics, Measurement Techniques, and Tools", IEEE Network, Nov.-Dec. 2003, 12 pages.

RIS International Ltd., "Canadian Consumer Battery Baseline Study Final Report", The Green Lane, Environment Canada's World Wide Web site, Feb. 2007, 90 pages.

Satyanarayaan et al., "The Case for VM-Based Cloudlets in Mobile Computing", IEEE Pervasive Computing, Oct.-Dec. 2009, pp. 2-11.

Savage, "Sting: A TCP-based Network Measurement Tool", Proceedings of the 2nd onference on USENIX Symposium on Internet Technologies and Systems, Oct. 1999, 9 pages.

Seshasayee et al., "Energy-aware MobileService Overlays: Cooperative Dynamic Power Management in Distributed Mobile Systems", Proceedings of the Fourth International Conference on Autonomic Computing, Jun. 2007, 10 pages.

"SiBEAM Reveals 60GHz Wireless Semiconductor Technology", retrieved from <<http://www.digitaltvnews.net/?p=240>>, Jun. 2007, 2 pages.

Su et al., "Slingshot Deploying Stateful Services in Wireless Hotspots", The Third International Conference on Mobile Systems, Applications, and Services (Mobisys'05), Jun. 2005, pp, 79-92.

Weiser et al., "Scheduling for Reduced CPU Energy", Proceedings of the 1st USENIX Conference on Operating Systems Design and Implementation, Nov. 1994, 15 pages.

"WIMAX Forum", retrieved on Feb. 3, 2010 from <<http://www.wimaxforum.org/>>, 1 page.

Young et al., "Protium, and Infrastructure for Partitioned Applications", Proceedings of the Eighth Workshop on Hot Topics in Operating Systems, May 2001, 14 pages.

Yu et al., "Adaptive Rf Chain Management for Energy-Efficient Spatial-Multiplexing MIMO Transmission", Proceedings of the 14th ACM/IEEE International Symposium on Low Power Electronics and Design (ISLPED'09), Aug. 2009, pp. 401-406.

\* cited by examiner

ESTIMATING APPLICATION ENERGY USAGE IN A TARGET DEVICE

BACKGROUND

Developers write software applications that are meant to be executed on multiple computing platforms and models, such as different models of smart phones, tablet computers, netbooks, personal computers, e-readers, and other devices. These various computing platforms have different hardware capabilities—such as processor speeds, memory capacities, bus speeds, display sizes, and so forth—and these various computing platforms consume different amounts of energy during operation. Testing a software application on all such devices is often impractical. Also, an application developer wanting to optimize an application in various dimensions, such as performance, portability, and energy consumption, would need physical access to the devices and, potentially, on-board or external power meters in order to measure their application's usage of power. Even with such access, it is not easy to determine an individual component's energy consumption, or how much of a component-specific energy consumption is attributable to a particular software application.

Also, an application consumes varying amounts of energy depending on operating conditions, such as signal strength, display brightness, network congestion, and so forth. It is often impractical for the developer to subject multiple devices to these various operating conditions in order to test an application's usage of energy under each scenario.

BRIEF SUMMARY

This Summary is provided in order to introduce simplified concepts of target device energy usage estimation, which are further described below in the Detailed Description. This summary is not intended to identify essential features of the claimed subject matter, nor is it intended for use in determining the scope of the claimed subject matter.

A test application—such as an application under development—is executed within a virtual execution environment that emulates the target device. The virtual execution environment may be hosted on any system, such as a development workstation (referred to as the emulation system). The virtual execution environment provides scaled access to hardware components of the emulation system in order to substantially simulate the capabilities of a target device. A measurement module measures the hardware resource usage on the emulation system that is attributable to the execution of the test application, and the measured hardware resource usage is fed into a power model to estimate the energy that the target device would consume if the target device were to execute the test application. The power model is developed based on resource and power profiling of the target device.

The virtual execution environment provides the ability to simulate various operating states, in order to estimate the energy usage attributable to an application under the various operating states.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, testing an application on all of the computing devices that it is designed for is often impractical. Yet, devices differ in their capabilities and are likely to consume different amounts of energy while executing the same application. Embodiments of the present Detailed Description, among other things, execute a test application—such as an application under development—in a virtual execution environment of an emulation system, such as on a developer workstation. The virtual execution environment provides access to application programming interfaces that simulate those available on a target device, such as a mobile device for which an application is being developed. The virtual execution environment also provides scaled access to the hardware resources of the emulation system in order to simulate the hardware capabilities of the target device. For example, a target device may have a slower processor than the emulation system. Thus, embodiments make fewer processor cycles available to the virtual execution environment in order to substantially simulate the slower processor speed of the target device. In embodiments, the virtual execution environment also simulates various operating conditions.

A measurement module measures the hardware resource usage attributable to the execution of the test application. The measured hardware resource usage is fed into a power model to estimate the energy that the target device would consume if the target device were to execute the test application. The power model is developed based on resource and power profiling of the target device.

Developing a power model for a target device may require access to the target device, including the placement of on-board power meters. But once developed for a particular target device, the power model can be used repeatedly to estimate the energy usage associated with executing applications on the target device. Target device power models can be shared with application developers, making it possible for application developers to estimate energy usage for their applications without having physical access to the target devices. Various embodiments provide access to the virtual execution environment for the target device, including resource scaling and operating condition simulation, as part of a distributed computing service accessible by application developers over the Internet.

The processes, systems, and devices described herein may be implemented in a number of ways. Example implementations are provided below with reference to the following figures.

Example Environment for Estimating Energy Usage

Figure 1:
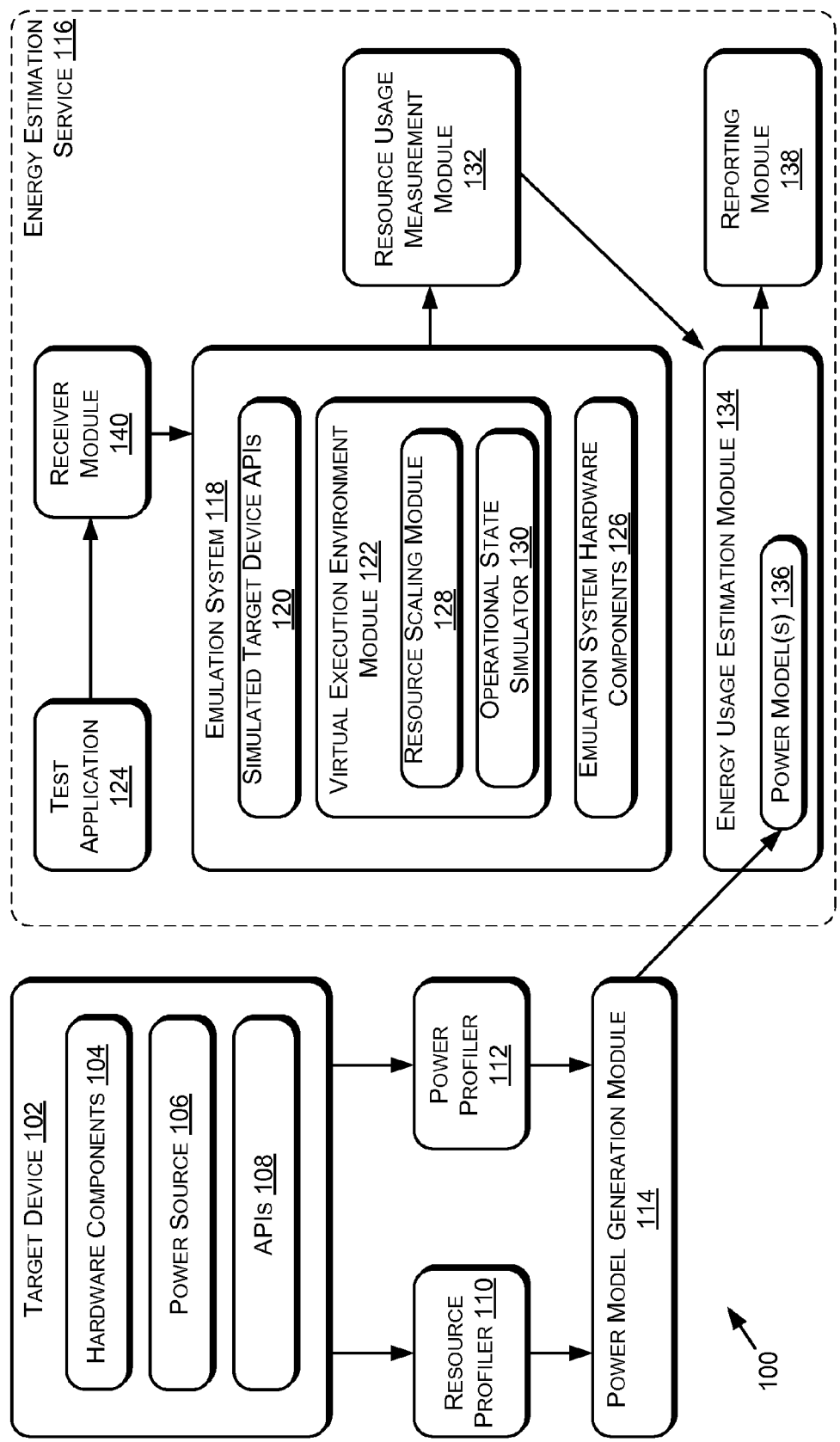
FIG. 1 is a schematic diagram of an example system usable to estimate energy usage in a target device.

FIG. 1 is a schematic diagram of an example system 100 usable to estimate energy usage in a target device. Aspects of the system 100 may be implemented on various suitable computing device types that are capable of implementing an energy emulation system. Suitable computing device or devices may include, or be part of, one or more personal computers, servers, server farms, datacenters, special purpose computers, tablet computers, game consoles, smartphones, combinations of these, or any other computing device(s) capable of storing and executing all or part of an energy emulation system.

Aspects of system 100 generate power models for a target device 102. The target device 102 includes a plurality of hardware components 104. Non-limiting examples of the hardware components 104 include one or more processors, computer-readable storage media, networking hardware (such as wired or wireless networking cards, radios, transceivers, and the like), input and output peripherals (such as pointer devices, touch screens, microphones, cameras, speakers and so forth), location devices (such as global positioning system (GPS) receivers or wireless network devices), and so forth.

The target device 102 also includes a power source 106, such as a battery, solar power generator, cabled or wireless power supply, and the like. The target device 102 also includes a plurality of application programming interfaces (APIs) 108 that provide, among other things, applications executing on the target device with access to the hardware components 104.

A resource profiler 110 profiles one or more of the hardware components 104 and their corresponding capabilities. For example, the resource profiler 110 may profile the hardware capabilities of a processor of the target device 102, such as the processor frequency, a CPU cache size, a CPU bus speed, and so forth. The resource profiler 110 may profile the memory capability of one or more memory components of the hardware components 104, such as a hard disc drive (HDD), a flash drive, a RAM device, a ROM device, and so forth. The resource profiler 110 may profile the display size and brightness settings of a display of the hardware components 104. The resource profiler 110 may profile one or more wireless transceivers/radios available within the hardware components 104, such as wireless transceivers/radios configured to operate in a 2G, 3G, 4G, or other wireless cellular network, wireless transceivers/radios configured to operate in a Wi-Fi-enabled network such as those specified by the IEEE 802.11 standards, wireless transceivers/radios configured to operate in a personal area network (PAN) network such as Bluetooth® network, wireless transceivers/radios configured to operate in a Near Field Communication (NFC) network, and so forth. In addition, embodiments of the resource profiler 110 may profile other hardware component types, such as location service components (such as Global Positioning System (GPS) devices), infrared transmitters, gaming controllers, and so forth, without departing from the scope of this Detailed Description. In embodiments, the resource profiler 110 may profile only a subset of the hardware components 104, such as those hardware components that are likely to have a significant impact on energy usage. In a non-limiting example, the resource profiler may be configured to profile the capabilities of the processor, memory, 4G radio, input and output capabilities of a touch-screen display, and a GPS of a target device while ignoring the capabilities of a NFC transceiver.

A power profiler 112 measures the power consumed by the hardware components 104 under various resource usage levels or states. In one non-limiting example, the power consumed by a processor of the target device 102 may be measured at various resource utilization levels, such as in 5% increments, such that the power consumed at 5%, 10%, 15%, all the way to 100% is measured. Other increments, both smaller and larger, evenly distributed or otherwise, may be used without departing from the scope of the present Detailed Description. In another non-limiting example, the power consumed by a wireless radio component of the target device 102 may be measured while the radio component transmits under different signal strengths, such as while transmitting at 10% of maximum signal strength, 20%, 30%, and so on. (Other increments both larger and smaller, evenly distributed or otherwise, may be used). The power consumption of other ones of the hardware components 104 may be modeled, such as the power consumed by read, write, and/or refresh operations of a random access memory (RAM) component, the power consumed during receipt of input by a touch-sensitive input, or the power consumed by a touch screen display under various brightness settings, under various refresh rates, or while displaying various colors. Embodiments are not limited to these examples, and the power profiler 112 may measure the power consumption of other hardware components, or the power consumed by the hardware components under other conditions not mentioned above, without departing from the scope of embodiments. The power profiler 112 may be configured to determine baseline energy levels, such as the amount of power consumed during startup of the target device 102, and the power consumed running background processes, searching for a wireless signal, and so forth.

The power model generation module 114 may generate a power model for the target device 102. The power model generation module 114 may utilize machine learning or similar technique to model the power consumption of the target device 102. The power model for the target device 102 includes individual power models for one or more of the hardware components 104. A power model for an individual hardware component is of the form of $E=f(r)$, where E represents energy consumed by a hardware component, and r represents the resource usage of the hardware component. The notation $f(r)$ denotes a mathematical function of r, or a "power model function." Various embodiments utilize a mathematical function $f(r)$, but various embodiments may utilize look-up tables, or some combination of mathematical formulas or look-up tables. In various embodiments, resource utilization values are input into the power model for each component, and an energy usage number is returned. The resource utilization values may absolute values such as number of memory reads, processor cycles, an amount of time a hardware component is operational and so forth. Or, the resource utilization values may be, in various embodiments, relative values, such as percentages of maximum transmission strength, percentages of processor utilization, and so forth. Resource utilizations values may also be power states that refer to the mode of operation of the component such as "operating at high frequency," "in active state," and other such states that may signify a different power level in the power model.

Various embodiments of the power model generation module 114 may employ modeling techniques such as are described in "Sesame: Self-Constructive System Energy Modeling for Battery-Powered Mobile Systems," by Mian Dong and Lin Zhong, ACM MObisys 2011; "Virtual Machine Power Metering and Provisioning," by Aman Kansal, Feng Zhao, Jie Liu, Nupur Kothari, and Arka Bhattacharya, SoCC'10, Jun. 10-11, 2010; and U.S. patent application Ser. No. 12/420,372, entitled "Computational Energy Measurement Without Hardware Support," filed on Apr. 8, 2009. Embodiments of the present disclosure are not limited to the modeling techniques disclosed in these three references, and other techniques may be used without departing from the scope of the present disclosure. The entire contents of U.S. patent application Ser. No. 12/420,372 is hereby incorporated herein in its entirety for all purposes.

The system 100 also includes an energy estimation service 116. The resource profiler 110, the power profiler 112, and the power model generation module 114 may be part of the same computing system as the energy estimation service 116. Alternatively, the resource profiler 110, the power profiler 112, and the power model generation module 114 may be part of a computing system that is different than the computing system that hosts the energy estimation service 116. In any event, the energy estimation service 116 includes an emulation system 118. The emulation system 118 may be a developer workstation (or other developer-controlled device). Alternatively, the emulation system 118 may be implemented on one or more devices in a distributed computing environment, provided as a "cloud-based" service to application developers (or others).

The virtual execution environment 122 on the emulation system 118 includes simulated target device APIs 120 that simulate the APIs 108 available on the target device 102. This allows a virtual execution environment module 122 of the emulation system 118 to provide a test application 124 with a virtual execution environment that emulates the execution environment on the target device 102. The simulated target device APIs 120 provide the test application 124 with access to various operating system functions, and access to the emulation system hardware components 126.

Non-limiting examples of the emulation system hardware components 126 include one or more processors, computer-readable storage media, networking hardware (such as wired or wireless networking cards, radios, transceivers, and the like), input and output peripherals (such as pointing devices, touch screens, microphones, cameras, speakers and so forth), location devices (such as global positioning system (GPS) receivers or wireless network devices), and so forth. Various ones of the emulation system hardware components 126 are likely different than, and likely have different capabilities than, corresponding ones of the hardware components 104 of target device 102. For example, target device 102 may have one single-core processor, while the emulation system hardware components 126 may include a multi-core/multi-processor architecture. In another non-limiting example, a processor of the target device 102 may have a different cache memory size than does a processor of the emulation system hardware components 126. The emulation system hardware components 126 may also include memories, networking components, busses, displays, peripheral devices, and other devices that differ from comparable components within the hardware components 104.

Differences between the hardware components 104 of the target device 102 and the emulation system hardware components 126 result in different resource use on the target device 102 and the emulation system 118 when executing the test application 124. For example, time instances at which various application operations occur, the nature and size of the display, and the speed of the processor, may make the execution of the application on the emulation system 118 significantly different from that on the target device 102. Thus, in embodiments, resource scaling is employed in order to make execution of the test application 124 the same as or similar to execution of the test application 124 on the target device 102.

A resource scaling module 128 provides a virtual execution environment of the virtual execution environment module 122 with scaled access to one or more of the emulation system hardware components 126 in order to substantially simulate the capabilities of corresponding ones of one or more of the hardware components 104 of the target device 102. The resource scaling module 128 may employ a resource scaling map, or some other data regarding the capabilities of the hardware components 104 of the target device 102, to accomplish this resource scaling. The resource scaling map may be developed based on data collected by the resource profiler 110, or from information from another source. In one non-limiting example, the resource scaling module 128 may provide the virtual execution environment with scaled access to the one or more processors of the emulation system hardware components 126 to substantially simulate central processing unit (CPU) capabilities of the target device 102. This may involve, for example, reducing the number of processor cycles available to the virtual execution environment. It may also involve reducing the amount of cache memory available to the virtual execution environment.

In another non-limiting example, the resource scaling module 128 may provide the virtual execution environment with scaled access to a network hardware component of the emulation system hardware components 126 to substantially simulate networking component capabilities of the target device 102. To accomplish this, the resource scaling module 128 provides the virtual execution environment with a virtual network driver that scales the networking capabilities of the emulation system hardware components 126 in order to substantially simulate the networking capabilities of the target device 102. This may be based on the known characteristics of the target device's 102 networking channel. In one non-limiting example, the virtual network driver may emulate a typical wireless networking experience on a 3G cellular wireless network, such as by routing data traffic through a wireless network emulator. This may involve, for example, reducing the data rate available to the virtual execution environment, artificially inducing delay to packets sent to and from the virtual execution environment, artificially inducing packet loss, inducing elevated levels of packet jitter, or other techniques.

In another non-limiting example, the resource scaling module 128 may provide scaled access to a bus of the emulation system hardware components 126 to substantially simulate a bus speed of a bus coupled to the processor of the target device 102. In a further non-limiting example, the resource scaling module may provide the virtual execution environment with a virtual display. The virtual display is created using a smaller portion of a display device of the emulation system hardware components 126, such that the virtual display is similar in size to a display on the target device 102. This virtual display may be, in embodiments, an application window that is sized to match a display of target device 102 such that the test application 124 is run within the application window.

In addition to providing resource scaling to the virtual execution environment via the resource scaling module 128, the virtual execution environment module 122 may also provide simulated operational states via an operational state simulator 130. An application developer may be interested in how various operational states impact the energy usage on the target device 102. Thus, various operational states may be simulated. The operational state simulator 130 is configured to simulate operation of the target device 102 under high CPU utilization conditions. As noted above, the resource scaling module 128 provides the virtual execution environment with a reduced number of processor cycles to substantially simulate the processor capabilities of the target device 102. The operational state simulator 130 is configured to simulate high CPU utilization further reduce the number of processor cycles available to the virtual execution environment. This further reduction may occur intermittently in order to simulate another application executing on the target device 104.

Alternatively, the operational state simulator 130 is configured to cause other applications to run within the virtual execution environment to substantially simulate a shared resource environment (which simulates more than just shared CPU).

In another non-limiting example, the operational state simulator 130 is configured to simulate various network states that may be experienced by the target device 102. As noted above, the resource scaling module 128 is configured to provide reduced access to the networking components of the emulation system hardware components 126 in order to substantially simulate networking capabilities of the target device 102. The operational state simulator 130 is configured to simulate network congestion or poor signal strength conditions by providing a further reduced access to the networking components, such as by artificially introducing additional delay, dropped packets, or by further scaling back the data rate. This additional delay, these dropped packets, and/or the further scaled back data rate are in addition to the resource scaling performed by the resource scaling module 128, and may be provided by the wireless networking emulator discussed above.

A resource usage measurement module 132 is configured to measure the resource usage within the emulation system 118 that is attributable to execution of the test application 124 within the virtual execution environment. The resource usage measurement module 132 monitors the calls that the test application 124 makes to various ones of the emulation system hardware components 126, such as by monitoring calls to the simulated target device APIs 120. Because the test application 124 runs within a virtual execution environment with scaled access to the emulation system hardware components 126, the resource usage monitored by the resource usage measurement module 132 is the same or similar to the resource utilization that would occur were the test application 124 to be executed on the target device 102.

In embodiments where the test application 124 is executed under various operational states, as provided by the operational state simulator 130, resource usages for the execution of each of these states are individually monitored.

In alternative embodiments, the resource usage measurement module 132 may be stored and executed on the target device 102. In these and other embodiments, the resource usage measurement module may be configured to measure resource usage of the test application 124 directly on the target device 102, and not in the emulation system 118.

An energy usage estimation module 134 is configured to estimate, based on a power model(s) 136 of the target device 102 and the resource usage measured by the resource usage measurement module 132, the energy usage associated with execution of the test application 124 by the target device 102. The power model(s) 136 is generated by power model generation module 114, as discussed elsewhere within this Detailed Description. The input to the power model(s) 136 is the resource usage for each monitored hardware component of the emulation system hardware components 126 as measured by the resource usage measurement module 132, and the output includes energy usage estimations for one or more of the hardware components 104 of the target device 102 that would be attributable to executing the test application 124 on the target device 102. The total energy usage estimations for the one or more of the hardware components 104 results in an estimation for the total energy consumed were the test application 124 to be run on the target device 102.

The energy usage estimation module 134 is configured, in embodiments, to determine energy usage for individual components within the emulation system hardware components 126. For example, where the emulation system hardware components 126 include a first hardware component (such as a processor or other component) and a second hardware component (such as a display or other component), the energy usage estimation module 134 is configured to estimate a first component-specific energy usage associated with the first hardware component based on a resource usage of the first hardware component. The energy usage estimation module 134 is also configured to estimate a second component-specific energy usage associated with the second hardware component based on a resource usage of the second hardware component.

The energy usage estimation module 134 is further configured to estimate energy usage at various display brightness levels of the target device 102. The power model(s) 136 includes energy usage information for various display brightness levels. Thus, the energy usage estimation module 134 can estimate the energy usage caused by execution of the test application 124 under these various brightness levels. As noted above, the resource scaling module 128 is configured to provide a virtual display. The resource usage measurement module 132 measures the test application 124 usage of a display of the emulation system hardware components 126. But an estimate for the energy consumed by a display of the target device 102 depends on the brightness setting of the display. Thus, the energy usage estimation module 134 is configured to estimate the energy usage of the display of the target device 102 based on one or more brightness settings.

The energy usage estimation module 134 may be configurable to include within the energy estimation a baseline energy usage of the target device 102. For example, if an application developer believes that the target device 102 will typically be woken from a sleep state in order to execute the test application 124, then the developer may be interested in knowing the baseline energy usage of the target device 102 as well as the energy usage attributable directly to execution of the test application 124.

A reporting module 138 is configured to report the estimated energy usage determined by the energy usage estimation module 134. The reporting module 138 may cause display of a report on a user interface of some kind (such as a web-based user interface), a reporting email, or some other reporting manner. The reporting module 138 is configured, in various embodiments, to provide a total energy usage estimation for the target device 102, one or more component-specific energy usage estimations for the hardware components 104 of the target device 102, total energy usage estimations and/or component-specific energy usage estimations for one or more simulated operating states, and total energy usage estimations and/or component-specific energy usage estimations for different versions of the test application 124. The reporting module 138 is configured to report the estimated energy usages associated with various brightness settings.

The reporting module 138 may be configured to determine whether the estimated energy usage meets one or more guidelines. Upon a determination that the estimated energy usage fails to meet the one or more guidelines, the reporting module 138 issues a warning. In embodiments, the warning may indicate that observed energy use patterns violate one or more energy efficient application development guidelines. In embodiments, the warning may indicate that the observed energy use patterns are expected to lead to excessive energy use.

A receiver module 140 is configured to receive the test application 124, and cause the emulation system 118 to execute the test application. The receiver module may include a web-server front-end that provides an interface for application developers to upload one or more test applications for execution in a virtual execution environment. The receiver module 140 may work in conjunction with the emulation system 118 to test several versions of a test application. For example, the receiver module 140 may receive a first test application that is configured to execute natively, or entirely within target device 102. The receiver module 140 may be configure to receive a second test application that includes a subset of the plurality of functions of the first test application but that offloads an execution of other ones of the plurality of functions not in the subset to a network-based service communicatively coupled to the emulation system 118 via a network component of the emulation system hardware components 126. In other embodiments, a developer may want to test one version of an application that performs various functions simultaneously, and a second version that performs the various functions sequentially. When multiple versions are to be tested, both the first and the second versions are executed by the virtual execution environment module 122 of the emulation system 118, and under one or more simulated operational states provided by the operational state simulator 130. The resource usage measurement module 132 is configure to measure the resource usage of the two different versions, and the energy usage estimation module 134 is configured to estimate total and/or component-specific energy usage for the two different versions. The reporting module 138 is configured to report these total and/or component-specific energy usages.

Example Computing System for Energy Estimation

Figure 2:
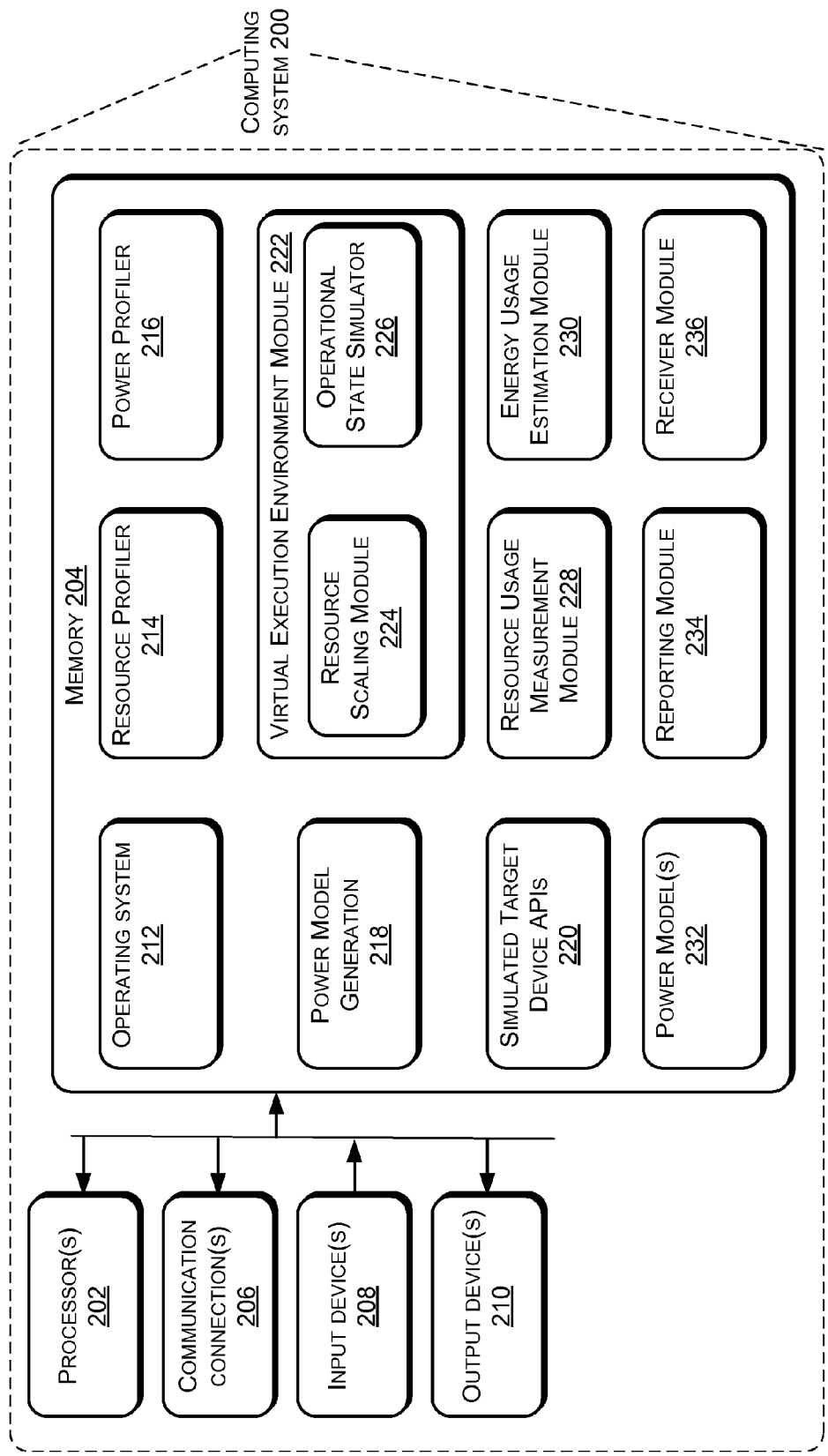
FIG. 2 is a block diagram of an example computing system usable to provide energy estimation for a target device.

FIG. 2 is a block diagram of an example computing system usable to provide energy estimation for a target device. The computing system 200 may be configured as any suitable computing device capable of implementing an energy emulation system. According to various non-limiting examples, suitable computing devices may include personal computers (PCs), servers, server farms, datacenters, special purpose computers, tablet computers, game consoles, smartphones, combinations of these, or any other computing device(s) capable of storing and executing all or part of an energy estimation service.

In one example configuration, the computing system 200 comprises one or more processors 202 and memory 204. The computing system 200 may also contain communication components 206 that allow communications with various other systems, such as one or more radio transceivers, or one or more wired networking components. The computing system 200 may also include one or more input devices 208, such as a keyboard, mouse, pen, voice input device, touch input device, GPS receiver, etc., and one or more output devices 210, such as a display, touch-screen display, speakers, printer, etc. coupled communicatively to the processor(s) 202 and memory 204. The processors 204, memory 204, communication components 206, input devices 208, and output devices 210 may be the same as or similar to the emulation system hardware components 126.

Memory 204 may store program instructions that are loadable and executable on the processor(s) 202, as well as data generated during execution of, and/or usable in conjunction with, these programs. In the illustrated example, memory 204 stores an operating system 212, which provides basic system functionality of the computing system 200 and, among other things, provides for operation of the other programs and modules of the computing system 200.

Memory 204 includes a resource profiler 214, power profiler 216, and power model generation module 218, which may be the same as or similar to resource profiler 110, power profiler 112, and power model generation module 114, respectively.

Memory 204 includes simulated target device APIs 220, which may be the same as or similar to simulated target device APIs 120. Memory 204 includes virtual execution environment module 222, which may be the same as or similar to the virtual execution environment module 122. The virtual execution environment module 222 includes resource scaling module 224 and operational state simulator 226, which may be the same as or similar to resource scaling module 128 and operational state simulator 130, respectively.

Memory 204 includes resource usage measurement module 228 and energy usage estimation module 230, which may be the same as or similar to resource usage measurement module 132 and energy usage estimation module 134, respectively. The energy usage estimation module 134 may make use of power models 232, which may be the same as or similar to the power model(s) 136. Memory 204 includes reporting module 234 and receiver module 236, which may be the same as or similar to the reporting module 138 and receiver module 140, respectively.

Exemplary Distributed Environment for Providing Energy Estimation Services

Figure 3:
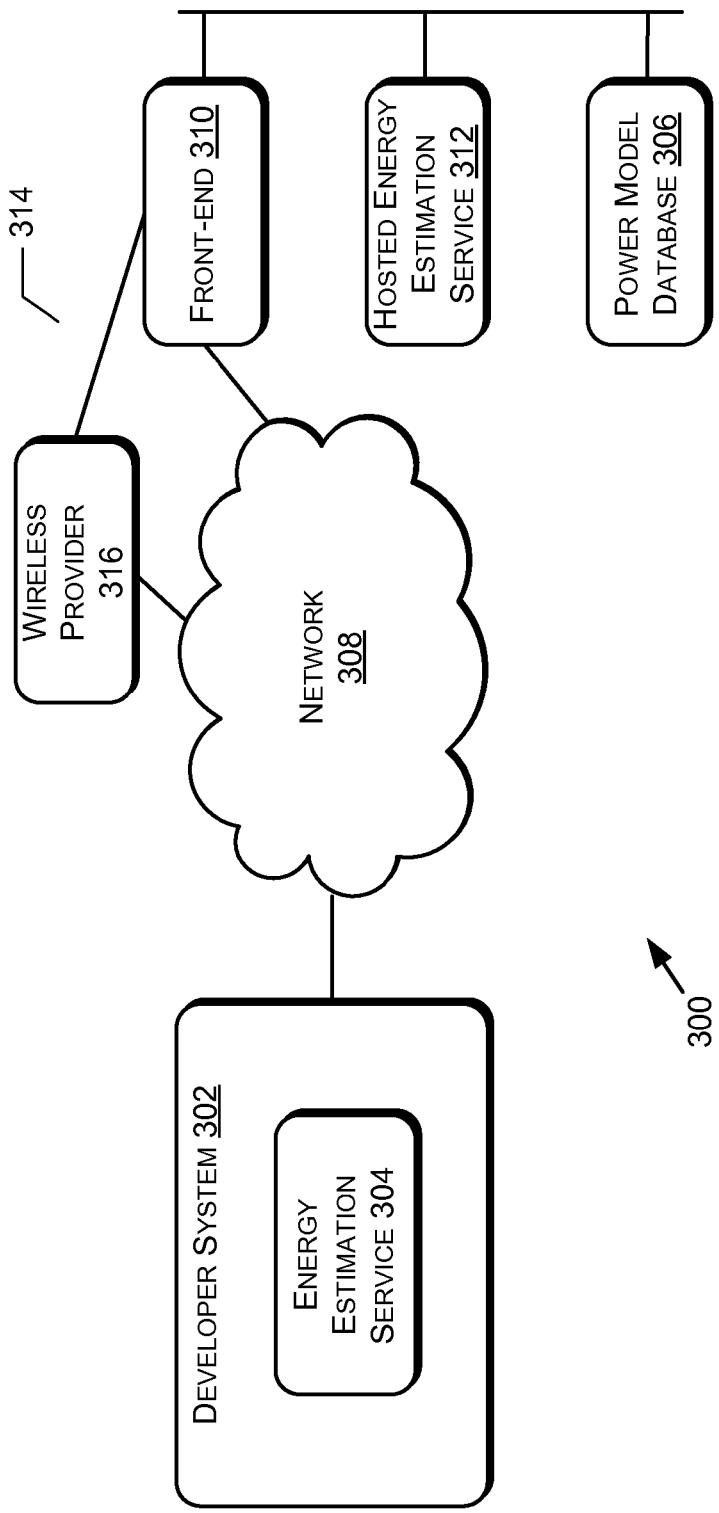
FIG. 3 illustrates an example of an energy estimation service provided by a distributed computing environment.

FIG. 3 illustrates an example of an energy estimation service provided by a distributed computing environment 300. A developer system 302 may include an energy estimation service 304, which may be the same as or similar to the energy estimation service 116. The energy estimation service 304 may be configured to retrieve power models from a power model database 306 via network 308 and front-end 310. The front-end 310 may be, in one non-limiting example, a web server configured to provide access to the power models in the power model database 306. The network 308 may be one of various network types, such as the public Internet.

By sharing power models from power model database 306 with various developers such as developer system 302, embodiments enable developers to use the energy estimation service 304 to estimate the energy usages of their applications without needing physical access to target devices.

In embodiments, a hosted energy estimation service 312 is provided as via the front-end 310. The hosted energy estimation service 312 may be the same as or similar to energy estimation service 116. In these embodiments, the developer system 302 does not need to install the energy estimation service 304. Furthermore, the hosted energy estimation service 312 may include a hosted wireless connection 314, via a wireless provider 316, to the network 308. This allows the hosted energy estimation service 312 to provide actual wireless access to the hosted energy estimation service 312 in order to simulate the wireless access of a target device.

Exemplary Operations for Providing an Energy Estimation Service

Figure 4:
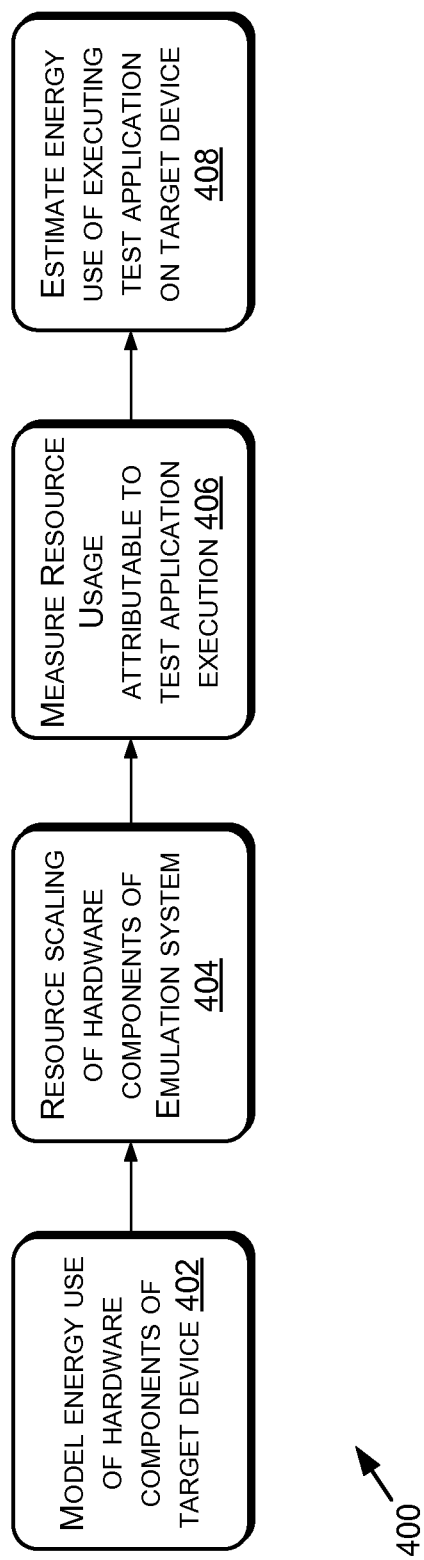
FIG. 4 is a flow diagram showing an example process for modeling a target device and estimating energy usage by an application executing in the target device.

FIG. 4 is a flow diagram showing an example process 400 for modeling a target device and estimating energy usage by an application executing in a target device. At 402, the power utilization of the hardware components of a target device is modeled. The resulting power model includes power models for various components of the target device. A power model for an individual hardware component is of the form of $E=f(r)$, where E represents energy consumed by a hardware component, and r represents the resource usage of the hardware component. The notation $f(r)$ denotes a mathematical function of r, or a "power model function." Various embodiments utilize a mathematical function $f(r)$, but various embodiments may utilize look-up tables, or some combination of mathematical formulas or look-up tables. In various embodiments, resource utilization values are input into the power model for each component, and an energy usage number is returned.

In one non-limiting example, where the component being modeled is the CPU, the resource usage, r, may be measured in terms of the CPU utilization, and the function $f(r)$ may be of the form a×r, implying energy used E=a×r where a represents the energy used over a time interval when the CPU is used at utilization r by the application being tested. In another non-limiting example, where the component being modeled is a communications component, the power model function may be based on parameters such as the time for which the network is powered up, the signal strength, an amount of data transferred by the test application, and so forth.

At 404, resource scaling is provided to a virtual execution environment of a test device. The resource scaling causes the virtual execution environment to simulate the execution environment of a target device by providing scaled access to the hardware components of the test device. The scaled access substantially simulates the hardware capabilities of the target device. The scaled access may include reduced access to processor cycles, reduced access to a processor cache memory, reduced access to a processor bus, reduced access to a computer-readable storage media of the test device, reduced access to a networking component of the test device, reduced access to a display device, and so forth.

At 406, a test application is executed in the virtual execution environment, and resource usage attributable to the test application is measured. The measured resource usage includes resource accesses made via one or more simulated target device APIs, to a display device, a processor, a computer-readable storage media, a networking component, a processor cache, a processor bus, and so forth.

At 408, the energy usage attributable to execution of the test application on the target device is estimated based on the measured resource usage and a power model for the target device. The measured resource usage for the hardware components of the emulation system attributable to the test application is input into the power model, and the power model returns energy usage estimations. The energy usage estimations are not estimations of the amount of energy that the test application consumes on the test device, but rather energy usage estimations for executing the test application on the target device. Because the virtual execution environment provides scaled access to the hardware resources of the test device to substantially simulate the capabilities of the target device, the resource usage of executing the test application in the test device is substantially similar to resource usage of executing the test application in the target device. Thus, the resource usage from executing the test application on the virtual execution environment is usable along with the power model for the target device to estimate how much energy would be consumed by the application were it to be executed on the target device.

Figure 5:
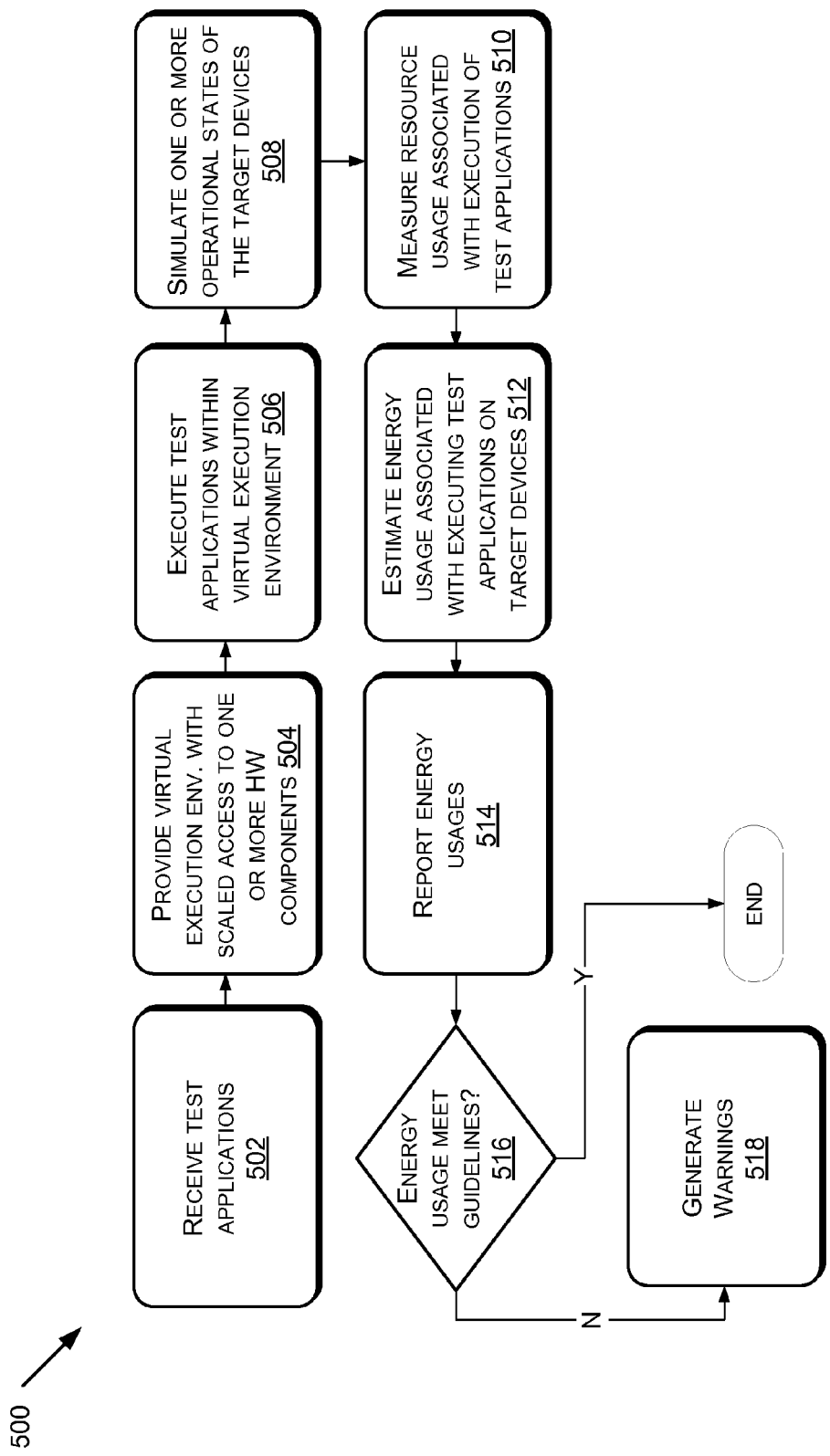
FIG. 5. is a flow diagram showing an example process for estimating application energy usage in a target device.

FIG. 5. is a flow diagram showing an example process 500 for estimating application energy usage in a target device. At 502, a receiver module receives a test application. The receiver module may receive multiple test applications, such as different versions of a test application. The receiver module may cause a virtual execution environment to execute the test applications.

At 504, a resource scaling module provides a virtual execution environment with scaled access to hardware components of the emulation system. Such resource scaling substantially simulates the hardware component capabilities of the hardware device. In embodiments, the scaled access may include scaled access to one or more processors of the emulation system, scaled access to a network hardware component of the emulation system, scaled access to a display device, scaled access to processor cache, scaled access to a processor-coupled bus, and so forth.

Scaled access to a processor of the emulation system may include providing the virtual execution environment with access to a reduced number of processor cycles. It may also include providing reduced access to a processor cache. Reduced access may include reduced access to a bus coupled to the processor to emulate a transfer rate capability of the processor-connected bus. Scaled access to a display device of the emulation system may include providing the test application with a virtual display, such as a display window within the display device that emulates a screen size of the target device. Scaled access to a networking component of the emulation system includes provisioning a wireless network emulator to route data packets to and from the test application.

The scaled access is configured to substantially simulate the hardware capabilities of the target device. In embodiments, the resource scaling module substantially simulates the capabilities of multiple target devices. Because the multiple target devices differ in their capabilities, the scaled access for the multiple target devices will also be different. In one non-limiting example, a first number of processor cycles are made available to the virtual execution environment by the resource scaling module when a test application is executed for estimating the energy usage on a first target device, and a second number of processor cycles are made available to the virtual execution environment when a test application is executed for estimating the energy usage on a second target device. The same or different test applications can be executed in the virtual execution environment when the virtual execution environment emulates a first target device and a second target device, depending on developer needs (e.g., to estimate energy usage of the same test application on both the first and second target device).

At 506, a virtual execution environment module executes the test application within a virtual execution environment of the emulation system. As noted above, the execution of the test application may include scaled access to the hardware components of the emulation system. The execution of the test application may be accompanied by execution of multiple versions of the same test application. For example, the virtual execution environment may execute another test application that includes a subset of the plurality of functions of the test application, but that offloads an execution of some functions of the test application to a network-based service. The network-based service may be communicatively coupled to the emulation system via a network hardware component of the emulation system, or via a hosted wireless link, or by other devices.

Execution of the test applications within the virtual execution environment includes providing simulated target device APIs to simulate the operating system functions available on the target device, as well as to provide (scaled) access to hardware capabilities of the emulation system. Where multiple target devices are emulated, the execution of the test applications includes providing access to multiple target device APIs.

An application developer may be interested in determining whether an application under development should be designed to execute natively on a target device, or whether certain processing could be offloaded to a distributed computing environment. The advantages of a natively-executing application include execution time: the more of the processing that occurs on the target device, the faster the application typically generally runs. But the advantages of offloading certain processes of the application to a network-based service include ease of portability: the application can more easily be made to execute on many different devices. But the energy usage advantages and disadvantages of these two application models are not always clear. On one hand, offloading some of the processing results in the processor consuming less power, but also generally results in the networking components of the target device consuming more power. Thus, embodiments—by providing for the execution of different versions of the test application—enable a developer to consider the energy usage of applications of these different application models when developing their software applications.

At 508, an operational state simulator simulates one or more operational states of the target device. A non-limiting example includes simulating a particular CPU utilization on the target device by providing further reduced access to the processor cycles of the one or more processors that is over-and-above the reduced access to the processor cycles provided in order to substantially simulate the capabilities of the target device. Another non-limiting example includes simulating network congestion by providing a reduced ceiling on the networking data rate.

Another non-limiting example includes executing multiple applications in the virtual execution environment simultaneously, in order to emulate a shared resource situation. In yet another non-limiting example, the plurality of operational states includes a first display brightness setting and a second display brightness setting, to simulate the operation of the target device in varying ambient light situations.

At 510, an energy usage measurement module measures resource usage associated with the execution of the test application. In embodiments where multiple test applications are executed (such as multiple versions of the test application), the measuring includes measuring resource usage associated with the executing of the various test applications. In embodiments that include simultaneous execution of the test application and another application within the virtual execution environment (such as to simulate a shared resource state), the measuring includes measuring the resource usage of the plurality of hardware components attributable to the test application as a result of the simultaneous execution of the test application and the other application. In embodiments that include simulation of a plurality of operational states, the measuring includes measuring a plurality of resource usages of the plurality of hardware components attributable to the execution of the test application within the virtual execution environment under the plurality of operational states.

At 512, an energy usage estimation module estimates, based on a power model of a target device and the resource usage associated with the executing of the test application, energy usage associated with executing the test application on the target device. Where the power model includes power models for multiple hardware components of the target device, the energy usage estimation includes estimating a first component-specific energy usage associated with a first hardware component based on resource usage of a corresponding first hardware component of the test device, and estimating a second component-specific energy usage associated with a second hardware component based on resource usage of a corresponding second hardware component of the test device.

In embodiments that include execution of multiple test applications (such as different versions of the same test application), the estimating includes estimating, based on the power model and the resource usage associated with the executing of another test application, the energy usage associated with executing the other test application on the target device. In embodiments that include executing the test application under a plurality of simulated operational states, the estimating includes estimating, based on the power model of the target device and measured plurality of resource usages under the different plurality of operation states, a plurality of energy usages for executing the test application on the target device under the plurality of operational states. In embodiments that include simultaneous execution the test application with another application within the virtual execution environment (such as to simulate a shared resource state), the estimating includes estimating the resource usage of the plurality of hardware components attributable to the test application as a result of the simultaneous execution of the test application and the other application.

At 514, a reporting module reports the estimated energy usage. Where the power model includes power models for multiple hardware components of the target device, the reporting includes reporting a first component-specific energy usage associated with a first hardware component, and reporting a second component-specific energy usage associated with a second hardware component.

In embodiments that include execution of multiple test application (such as different versions of the same test application), the reporting includes reporting the other energy usage associated with executing the other test application on the target device. In embodiments that include executing the test application under a plurality of simulated operational states, the reporting includes reporting a plurality of energy usages for executing the test application on the target device under the plurality of operational states. In embodiments that include simultaneous execution of the test application with another application within the virtual execution environment (such as to simulate a shared resource state), the reporting includes reporting the resource usage of the plurality of hardware components attributable to the test application as a result of the simultaneous execution of the test application and the other application.

At 516, a determination is made regarding whether the estimated energy usage of one or more of test applications meets one or more guidelines. At 518, a warning indicating that the estimated energy usage fails to meet one or more guidelines is generated. In embodiments, the warning may indicate that observed energy use patterns violate one or more energy efficient application development guidelines. In embodiments, the warning may indicate that the observed energy use patterns are expected to lead to excessive energy use. Other guidelines may be used without departing from the scope of embodiments. In various embodiments, the warning may be included with or separate from the estimated energy use report at 514.

FIGS. 4 and 5 depict flow graphs that show example processes in accordance with various embodiments. The operations of these processes are illustrated in individual blocks and summarized with reference to those blocks. The processes are illustrated as a logical flow graph, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be combined in any order, separated into sub-operations, and/or performed in parallel to implement the processes. Processes according to various embodiments of the present disclosure may include only some or all of the operations depicted in the logical flow graph.

Computer-Readable Media

Depending on the configuration and type of computing device used, memory 204 of the computing system 200 in FIG. 2 may include volatile memory (such as random access memory (RAM)) and/or non-volatile memory (such as read-only memory (ROM), flash memory, etc.). Memory 204 may also include additional removable storage and/or non-removable storage including, but not limited to, flash memory, magnetic storage, optical storage, and/or tape storage that may provide non-volatile storage of computer-readable instructions, data structures, program modules, and other data for computing system 200.

Memory 204 is an example of computer-readable media. Computer-readable media includes at least two types of computer-readable media, namely computer storage media and communications media.

Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A method, comprising:
   simulating, by one or more processors of a test system, an operating state of a target device within a virtual execution environment;
   executing a test application within the virtual execution environment while the virtual execution environment simulates the operating state of the target device, wherein executing the test application includes using scaled access to a resource of the test system, thereby limiting a performance capability of the resource of the test system, to substantially simulate a performance capability of at least one hardware component of the target device;
   measuring, while the virtual execution environment simulates the operating state of the target device, resource usage of the resource of the test system, the resource usage associated with execution of the test application within the virtual execution environment; and
   estimating, based on a power model of a target device and the resource usage associated with the execution of the test application on the test system, energy usage associated with executing the test application on the target device, the target device different from the test system.

2. The method of claim 1, wherein the scaled access to the resource of the test system includes scaled access to the one or more processors of the test system to substantially simulate capabilities of the one or more CPUs of the target device.

3. The method of claim 2, wherein the scaled access to the one or more processors includes reduced access to available processor cycles of the one or more processors, and wherein the method further comprises simulating a particular CPU utilization on the target device by providing further reduced access to the processor cycles of the one or more processors.

4. The method of claim 1, wherein:
   the scaled access to a resource of the test system includes scaled access to a network hardware component of the test system to substantially simulate networking component capabilities of the target device; and
   the method further comprises:
      providing a ceiling on a networking data rate available to the virtual execution environment, and
      simulating network congestion by one or more of providing a reduced ceiling on the networking data rate or dropping packets.

5. The method of claim 1, wherein the at least one hardware component of the target device includes a first hardware component and a second hardware component, and wherein the estimating includes estimating a first component-specific energy usage associated with the first hardware component based on resource usage of a corresponding first hardware component of the test device.

6. The method of claim 1, wherein the test application includes a plurality of functions, the method further comprising:
   executing, by the one or more processors, another test application within the virtual execution environment while the virtual execution environment simulates the operating state of the target device, wherein the other test application includes a subset of the plurality of functions of the test application and offloads an execution of other ones of the plurality of functions not in the subset to a network-based service communicatively coupled to the test system via a network hardware component of the test system;
   measuring, by the one or more processors, other resource usage associated with the executing of the other test application;
   estimating, by the one or more processors based on the power model and the other resource usage associated with the executing of the other test application, other energy usage associated with executing the other test application on the target device; and
   providing, by the one or more processors, a report comparing the energy usage and the other energy usage.

7. A system, comprising:
   a plurality of hardware components, including one or more processors;
   a virtual execution environment module executable by the one or more processors to:
      provide scaled access to at least one of the plurality of hardware components of the system to simulate a capability of a corresponding hardware component of a target device;

simulate an operating state of the target device within a virtual execution environment; and execute a test application within the virtual execution environment while the virtual execution environment simulates the operating state of the target device, the virtual execution environment providing a plurality of simulated application programming interfaces of the target device that provides the test application with access to the plurality of hardware components of the system;

a measurement module executable by the one or more processors to measure resource usage of the plurality of hardware components attributable to execution of the test application within the virtual execution environment while the virtual execution environment simulates the operating state of the target device;

an estimation module executable by the one or more processors to estimate, based on a power model of the target device and the resource usage, energy usage associated with execution of the test application by the target device; and a reporting module executable by the one or more processors to report the estimated energy usage.

8. The system of claim 7, wherein the power model of the target device is based on collected power measurements from the target device under various resource usage states.

9. The system of claim 7, wherein:

the virtual execution environment module is further executable to simultaneously execute the test application and another application within the virtual execution environment while the virtual execution environment simulates the operating state of the target device; and the measurement module is further executable to measure the resource usage of the plurality of hardware components attributable to the test application as a result of the simultaneous execution of the test application and the other application within the virtual execution environment while the virtual execution environment simulates the operating state of the target device.

10. The system of claim 7, wherein the target device includes a CPU connected to bus, the CPU includes a processor frequency capability and a CPU cache, and wherein the virtual execution environment module is executable to provide one or more of scaled access to a processor of the one or more processors to emulate the processor frequency capability of the CPU, scaled access to a cache of the processor to emulate a storage capability of the CPU cache, and scaled access to a bus coupled to the processor to emulate a transfer rate capability of the CPU-connected bus.

11. The system of claim 7, wherein:

the virtual execution environment module is further executable to:

simulate another operating state of another target device within another virtual execution environment, and execute another test application within the other virtual execution environment while the other virtual execution environment simulates the other operating state of the other target device, the other virtual execution environment providing another plurality of simulated application programming interfaces of the other target device that provides the other test application with access to the plurality of hardware components; and the system further comprising a receiver module executable by the one or more processors to receive the test application and the other test application and to cause the virtual execution environment module to execute the test application and the other test application in the virtual execution environment and the other virtual execution environment, respectively.

12. The system of claim 7, further comprising a wireless link to a service, and wherein:

the execution of the test application includes passing traffic between the virtual execution environment and the service via the wireless link;

the plurality of hardware components includes a networking component communicatively coupled to the wireless link; and the measurement module is further executable to estimate the resource usage based in part on resource usage of the networking component attributable to the passing traffic.

13. Computer-readable storage media including a plurality of programming instructions executable by one or more processors of a computer device to:

simulate an operating state of a target device within a virtual execution environment, the simulation of the operating state of the target device including scaled access to a plurality of hardware components of the computer device, the scaled access limiting performance capabilities of the computer device to simulate performance capabilities of the target device;

execute a test application within the virtual execution environment while the virtual execution environment simulates the operating state of the target device;

measure resource usage of the plurality of hardware components attributable to the execution of the test application within the virtual execution environment while the virtual execution environment simulates the operating state of the target device; and estimate, based on a power model of the target device and the measured resource usage, an energy usage for executing the test application on the target device.

14. The computer-readable storage media of claim 13, wherein the plurality of hardware components include a display device, and wherein the scaled access to the plurality of hardware components includes provision of a display window within the display device that emulates a screen size of the target device.

15. The computer-readable storage media of claim 13, wherein the operating state is a first operating state and the plurality of programming instructions are further executable to:

simulate a plurality of operating states including the first operating state;

measure a plurality of resource usages of the plurality of hardware components attributable to the execution of the test application within the virtual execution environment under the plurality of operating states;

estimate, based on the power model of the target device and measured plurality of resource usages, a plurality of energy usages for executing the test application on the target device under the plurality of operating states; and report the measured plurality of resource usages.

16. The computer-readable media of claim 15, wherein the plurality of operating states includes a first display brightness setting and a second display brightness setting.

17. The computer-readable media of claim 13, wherein the scaled access includes causing data packets to and from the test application to route through a wireless network emulator.

18. The method of claim 1, the operating state of the target device comprising utilization levels of at least one hardware component peripheral to one or more central processing units (CPUs) of the target device, wherein the utilization levels include at least one of a predetermined memory utilization level, a predetermined signal strength of a wireless radio component, a predetermined signal strength of Global Positioning System (GPS device) or a predetermined display brightness setting.

19. The method of claim 1, wherein:
- the performance capability of the resource of the test system is limited such that the performance capability is reduced from a maximum performance capability of the resource of the test system to a reduced performance capability of the resource of the test system; and
- measuring the resource usage of the resource of the test system is based at least in part on the execution of the test application by the test system at the reduced performance capability of the resource of the test system.

20. The system of claim 7, wherein the virtual execution environment module is further executable to at least partially restrict a performance capability of at least one of the plurality of hardware components of the system to simulate a performance capability of a corresponding hardware component of the target device.

* * * * *